United States Patent [19]

Guimier et al.

[11] 3,879,642

[45] Apr. 22, 1975

[54] MEMORIZER FOR COUNTING SYSTEM

[75] Inventors: Jacques A. Guimier, Chelles-les-Coudreaux; Pierre F. Coutin, Paris, both of France

[73] Assignee: R. Alkan & Cie, Valenton, France

[22] Filed: Dec. 4, 1973

[21] Appl. No.: 421,542

[30] Foreign Application Priority Data

Dec. 22, 1972 France .............................. 72.45946

[52] U.S. Cl. .............................. 317/155.5; 307/238

[51] Int. Cl. .............................. H01h 47/32

[58] Field of Search .................... 307/238, 282, 296; 317/140, 150, 155.5

[56] References Cited

UNITED STATES PATENTS 3,723,767 3/1973 Meyer et al. .......................... 307/238

*Primary Examiner*—James D. Trammell
*Assistant Examiner*—Harry E. Moose, Jr.
*Attorney, Agent, or Firm*—Ulle C. Linton

[57] ABSTRACT

This device for memorizing a counting system in case of failure in the supply mains utilizes magnetic-lock two-step electromagnetic relays of reduced over-all dimensions, the transfer of the counter state to said relays taking place only at the end of a sequence of pulses in case the counter is controlled by means of trains of pulses. Thus, the counter can be operated at a rate not limited by the response time of the relays while extending the useful life of said relays. (FIG. 1).

2 Claims, 5 Drawing Figures

MEMORIZER FOR COUNTING SYSTEM

BACKGROUND OF THE INVENTION

This invention relates in general to counting systems and more particularly to counting systems utilizing electronic decades; it is known that electronic decade counting systems are particularly advantageous in comparison with electro-mechanical counters. Thus, their rate of operation is significantly higher.

In certain applications, however, these electronic devices suffer from a major drawback: in case of failure in the supply mains their position is lost. In this case they are considered as lacking "memory." This inconvenience is particularly detrimental, inter alia, in devices equipping military aircrafts.

Now this memory function may be obtained by associating circuits incorporating magnetic tores with the electronic decades. However, this solution is also objectionable in that it is conductive to bulky structures.

Another solution characterised by reduced over-all dimensions consists in reproducing the state of outputs, A, B, C, D in two-steps electromagnetic relays. But in this system the rate of operation is limited by the response time of the relays, and the relays themselves have a relatively short useful life on account of their premature wear.

SUMMARY OF THE INVENTION

The present invention is directed to provide a device of the type broadly set forth hereinabove, which comprises the same two-step relays but so controlled that their rate of operation is not limited unduly.

According to this invention, the state of the counter is transferred to the realys only at the end of a sequence of pulses in case the counter is actuated by means of a train of pulses.

According to a complementary feature characterising this invention the two-step electromagnetic relays are energized to this end through a one-step relay responsive to the counting pulses but with a certain time-lag, for example the time-lag necessary for discharging a capacitor charged with counting pulses. This time-lag may control a univibrator delivering a control pulse of predetermined duration to the one-step relay of which the front circuit is adapted to supply energizing current to the two-step relays.

DESCRIPTION OF THE PREFERRED EMBODIMENT

Figure 1:
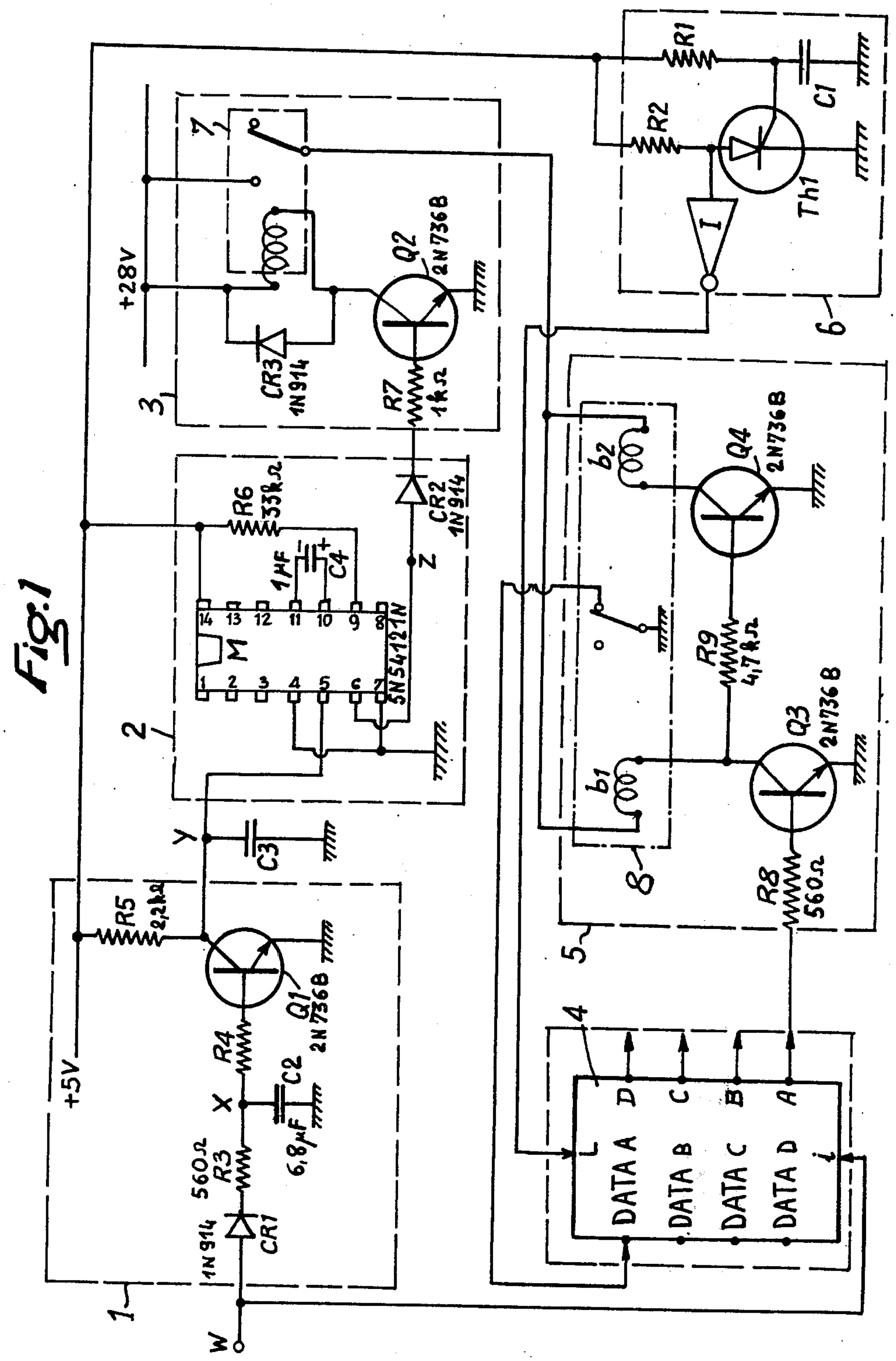
FIG. 1 is the wiring diagram of the circuits for carrying out this invention, with typical examples of characteristic values of the various circuit component elements.

The circuits illustrated in FIG. 1 comprise the units 1, 2, 3, 4 5 and 6 constituting a device for the delay-action discharge of a capacitor charged with the counting pulses, a univibrator 2 adapted, as a consequence of each train of pulses applied thereto, to deliver a pulse of predetermined duration, a device 3 comprising a one-step relay responsive to this last-named pulse, a counter 4, a device 5 comprising a two-step relay controlled by said one-step relay and said counter for reproducing the value recorded by the counter at the end of each train of pulses, and a device 6 for controlling the prepositioning of said counter when the assembly is switched on, respectively.

Figures 2, 3, 4, 5:
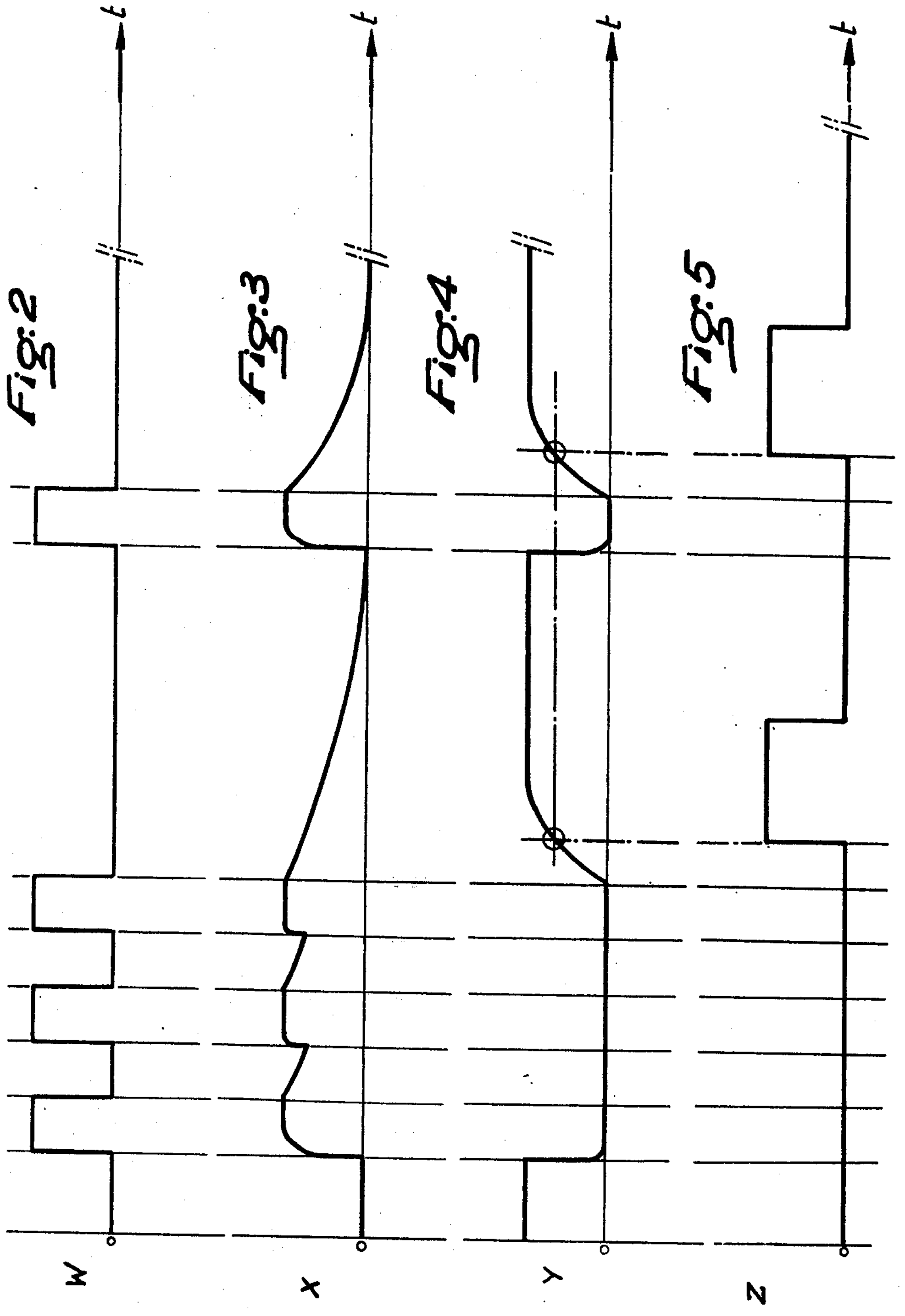
FIG. 2 is a diagram showing the waveform of the counting pulses at the counter input.
FIGS. 3, 4 and 5 illustrate the waveforms of the pulses obtaining at other points of the one-step relay control device.

The counting pulses received by the input Ware fed in parallel to the counting decades at *i* and to the capacitor device C2 of which the discharge time-lag is to be utilized. The frequency of the train of pulses at said input W in higher than a value set arbitrarily, for example 1 hz (FIG. 2). These pulses charge the capacitor C2 through a weak charging resistor R3 (For example 560 ohms) and this capacitor C2 is discharged to the base of a transistor Q1 through a strong resistor R4 (for example 22 kilo-ohms), so that the time constant of capacitor C2 at the discharge moment is high. As a result the voltage of capacitor C2 (at point X) has the waveform shown in FIG. 3. With this voltage the transistor Q1 becomes conducting and its collector circuit receiving a voltage of, say, +5V, comprises a resistor R5 from which another capacitor C3 is charged, so that the conducting state of transistor Q1 will zero the charging voltage of capacitor C3 received at Y; this voltage at Y has therefore the waveform illustrated in FIG. 4.

The voltage of capacitor C3 controls the trigger input of a univibrator M delivering at its output, i.e., at point Z, a pulse having its duration calibrated by another resistor R6 and a capacitor C4. This output pulse having the waveform shown in FIG. 5 is fed to the base of another transistor Q2 which becomes conducting so that its collector circuit receiving for example a 28 V-Voltage will energize a one-step relay 7 (shown in its de-energized condition) of which the front contact is also supplied with the same 28-V voltage.

When this relay 7 is energized, the junction point of the pair of coils *b*1 and *b*2 of a two-step relay 8 is supplied with this +28-Volt voltage but this occurs only once in a train of pulses, as will be readily understood from the diagrams of FIGS. 2 to 5.

During the counting, the coded output A of counter 4 assumes the states 0 and 1 in succession, its state 0 blocking a transistor Q3 through its base resistor R8 whereas its state 1 makes this transistor Q3 conducting. The collector circuit of transistor Q3 is energized through a relay 7 and comprises the first coil *b*1 of the two-step relay 8 of which the other coil *b*2 energized therewith is inserted in the collector circuit of another transistor Q4. The collector of transistor Q3 is connected to the base of transistor Q4 through a resistor R9.

When the output A is in said state 0, transistor Q3 is blocked and coil *b*1 is inoperative while transistor Q4 is rendered conducting and the movable contact arm of relay 8 is attracted by coil *b*2 (position of FIG. 1). In contrast thereto, if the output A is in state 1, transistor Q3 becomes conducting and coil *b*1 is energized while transistor Q4 is blocked so that the movable contact arm of relay 8 assumes the opposite position. Thus, after each train of pulses, the two-step relay 8 reproduces the state of output A associated therewith. The other outputs R, C, D of the counter are reproduced in the same manner by the associated two-step relays.

In case of failure in the supply mains, the two-step relay 8 is held in its position due to the magnetic locking thereof. When the assembly is switched on, a thyristor Th1 responsive to a circuit comprising a resistor R1 and a capacitor C1 connected in series is blocked during a short time the value of which is subordinate to the values of said resistor R1 and capacitor C1, and the circuit of this thyristor Th1, connected to the input L for prepositioning the counter 4 via a reversing switch I, will zero the output of this reversing switch I while connecting in the input L of counter 4. If the A-DATA input is zeroed through the movable contact arm of relay 8 (position shown in FIG. 1) the output A its position is 0, and in the opposite case this position is 1. When the thyristor Th1 is conducting, the input of reversing switch I is set to 0 and its output to 1, and under these conditions the DATA controls become inoperative.

What we claim is

1. Device for memorizing a counting system in case of failure in the supply mains, comprising a counting system utilizing electronic decades, magnetic-lock two-step relays of reduced over all dimensions, wherein a time lag is introduced in the transfer of said counting system state to said two-step relays in order that this transfer takes place only at the end of a sequence of pulses in case said counting system is controlled by means of a train of pulses, a one-step relay supplying energizing current to said two-step relays reproducing the state of said counter system, a univibrator circuit capable of delivering at the end of each train of counting pulses an output pulse of predetermined duration to said one-step relay, a capacitor controlling said univibrator circuit and charged with the counting pulses, and said capacitor being capable of introducing said time lag in the control of said two-step relays through the time constant of the discharge of said capacitor.

2. Device for memorizing a counting system in case of failure in the supply mains, as claimed in claim 1 including a thyristor, means for supplying an energizing current with a certain time lag to said thyristor and a counter prepositioning control means to be activated by said thyristor during the short time period in which said thyristor is blocked before becoming conducting.

* * * * *